(12) United States Patent
Hirschbolz et al.

(10) Patent No.: US 11,561,041 B2
(45) Date of Patent: Jan. 24, 2023

(54) HOUSEHOLD REFRIGERATION APPLIANCE WITH TWO PLATE-SHAPED LIGHT GUIDES OF A LIGHTING MODULE ARRANGED PARTIALLY OFFSET FROM ONE ANOTHER

(71) Applicant: BSH Hausgeraete GmbH, Munich (DE)

(72) Inventors: Andreas Hirschbolz, Syrgenstein (DE); Tobias Mayr, Gundelfingen an der Brenz (DE); Armin Weber, Lauchheim (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 17/542,870

(22) Filed: Dec. 6, 2021

(65) Prior Publication Data
US 2022/0187012 A1 Jun. 16, 2022

(30) Foreign Application Priority Data

Dec. 10, 2020 (DE) ..................... 10 2020 215 616.6

(51) Int. Cl.
*F25D 27/00* (2006.01)
*F21V 33/00* (2006.01)
*F21V 8/00* (2006.01)
*F21W 131/305* (2006.01)

(52) U.S. Cl.
CPC ........ *F25D 27/005* (2013.01); *F21V 33/0044* (2013.01); *G02B 6/0066* (2013.01); *F21W 2131/305* (2013.01)

(58) Field of Classification Search
CPC . F21W 2131/305; F25D 27/00; F25D 27/005; G02B 6/008; G02B 6/0078
See application file for complete search history.

(56) References Cited

U.S. PATENT DOCUMENTS 10,895,416 B2   1/2021  Weber et al.

FOREIGN PATENT DOCUMENTS

DE    102018205757 A1   10/2019

*Primary Examiner* — Robert J May
(74) *Attorney, Agent, or Firm* — Laurence A. Greenberg; Werner H. Stemer; Ralph E. Locher (57) ABSTRACT

A household refrigeration appliance has a receiving compartment for food and a planar lighting module for lighting the receiving compartment. The lighting module has a first lighting sub-module with a first plate-shaped light guide and a separate, second lighting sub-module directly adjoining the first sub-module and having a second plate-shaped light guide. The first light guide has a first edge and the second light guide has a first edge. The first edges are arranged facing one another and in a direction at right angles to a plane defined by the lighting module, an offset is formed between the first edges, so that in this direction the first edges are arranged at a distance from one another perpendicular to the plane.

17 Claims, 6 Drawing Sheets

HOUSEHOLD REFRIGERATION APPLIANCE WITH TWO PLATE-SHAPED LIGHT GUIDES OF A LIGHTING MODULE ARRANGED PARTIALLY OFFSET FROM ONE ANOTHER

CROSS-REFERENCE TO RELATED APPLICATION

This application claims the priority, under 35 U.S.C. § 119, of German Patent Application DE 10 2020 215 616.6, filed Dec. 10, 2020; the prior application is herewith incorporated by reference in its entirety.

FIELD AND BACKGROUND OF THE INVENTION

One aspect of the invention relates to a household refrigeration appliance with a receiving compartment for food. The household refrigeration appliance moreover has a plate-like lighting module for lighting the receiving compartment. This plate-like lighting module has a support apparatus, on which at least one light source module and one plate-shaped light guide are arranged.

Plate-like lighting modules are known for illuminating a receiving compartment of this type in as uniform and homogenous a manner as possible. In this regard, U.S. Pat. No. 10,895,416 B2 and its counterpart German published patent application DE 10 2018 205 757 A1 disclose a household refrigeration appliance with interior lighting, for instance. The structure of the plate-like lighting module there provides for a support plate to be arranged on the rear, which support plate cross-sectionally has a groove which opens to the front at the edge, on which a printed circuit board with a light source is arranged. A plate-shaped, or planar, light guide is arranged in front of the support plate when viewed toward the receiving compartment. The light of the light source is injected laterally herein. In this regard, the manufacture of this embodiment is relatively difficult. The rearward, that is, back support, plate is of a relatively complex shape.

Moreover, with prior art conventional plate-shaped lighting modules, a complex adhesion process is required in order to be able to connect individual components to one another. In this process adhesive can then also reach between those components of the lighting module. As a result, the lighting function of the lighting module can be affected.

SUMMARY OF THE INVENTION

It is accordingly an object of the invention to provide a household refrigeration appliance which overcomes the above-mentioned disadvantages of the heretofore-known devices and methods of this general type and which provides for an appliance in which the plate-shaped lighting module is improved.

With the above and other objects in view there is provided, in accordance with the invention, a household refrigeration appliance, comprising:

an appliance body formed with a receiving compartment for food and a planar lighting module for lighting said receiving compartment;

said planar lighting module having a support apparatus supporting a first lighting sub-module with a first plate-shaped light guide and a separate, second lighting sub-module with a second plate-shaped light guide;

said first and second lighting sub-modules being disposed directly adjacent one another;

each of said first and second light guides having a first edge, with said first edge of said first light guide facing said first edge of said second light guide; and in a direction perpendicular to a plane defined by said lighting module, said first edges of said first and second light guides being disposed with an offset between said first edges and at a spacing distance from one another in the direction perpendicular to the plane of said lighting module.

In other words, one aspect of the invention relates to a household refrigeration appliance with a receiving compartment for food. The household refrigeration appliance has a plate-like, or planar, lighting module for lighting the receiving compartment. The planar lighting module has a support apparatus. At least one light source module of the lighting module and at least one plate-shaped light guide of the lighting module are arranged on this support apparatus. This lighting module has a first lighting sub-module and a first plate-shaped light guide. The lighting module moreover has a separate second lighting sub-module with a second plate-shaped light guide. The first lighting sub-module is arranged directly adjoining the second lighting sub-module. The first light guide has a first edge. The second light guide, which is separate from the first light guide, has a first edge. These two separate light guides are arranged with their first edges facing one another. In one direction at right angles to the plane of the lighting module, in which the module is spread out in a two-dimensional manner, an offset is embodied between the first edges of these two light guides. This offset is oriented so that these first edges in this direction are arranged at a distance from one another at right angles to this plane. As a result, an entirely specific lighting module is produced for a household refrigeration appliance of this type. A compact and in this regard relatively thin design is therefore enabled on the basis of the basically plate-like embodiment. On the other hand, a large-area and uniform lighting of the receiving compartment is enabled. A lighting module of this type now has two separate, plate-shaped light guides, which are arranged directly adjacent and adjoining one another. However, they do not extend beyond their respective overall light guide surfaces in a shared plate. Instead, on account of this specifically oriented offset at the first edges which face one another and are directly adjacent to one another, it is possible to transfer an additional functionality to the lighting module. On account of this offset, installation space is created, which enables additional functionality to be integrated despite the large surface area of the lighting module. This differs in particular from the primary lighting functionality of the lighting module. On account of this arrangement of the light guides at their first edges, the uniform and extensive light radiation is not affected. In this regard the offset is designed so that the light radiation forwards over a large area is not affected. This is achieved in particular in that this offset is not embodied in the plane of the lighting module, but instead at a right angle in one direction. This additional functionality, in particular viewed in the width direction of the lighting module, can therefore also be integrated in as compact a manner as possible into the lighting module, without the lighting radiation forwards being affected.

In one exemplary embodiment, a spacer rib or a spacer wall is formed in the region of the offset. Holes are embodied in this spacer rib. It is therefore essentially possible for medium to be exchanged at this specific interface between the light guides from a site behind the lighting module to a site in front of the lighting module. A transport of media is therefore enabled at this specific point by means of the lighting module. By this offset, this spacer wall is formed in a plane of the lighting module, these holes can barely be seen when viewed at the front of the lighting module and thus when viewed at the front of the light guide. Viewed from the front, the sub-modules appear to be almost connected elements which are strung together without interruption in respect of the light radiation.

In one exemplary embodiment, the holes are embodied as ventilation slots of an air duct system of the household refrigeration appliance. Provision is therefore intentionally made for air to flow through these ventilation slots during operation of the air duct system. With this exemplary embodiment, a concept is enabled particularly advantageously in which a targeted transfer of air is enabled from behind the lighting module forwards in front of the lighting module into these interfaces between the light guides. Moreover, on account of this specific orientation of these holes, there is also no immediately strong forward escape of this air into the region in front of the lighting module. Instead, a lateral flow into a front region in front of the lighting module is firstly achieved by means of this orientation.

In one exemplary embodiment, an air duct of the air duct system is arranged on a rear of a lighting sub-module, in particular a rear of the support apparatus of the lighting sub-module. This is so that air in the air duct can be guided in a defined manner through these ventilation slots in front of the lighting module. A targeted flow of air behind the lighting module can therefore be enabled and a targeted flow of the air flowing therein to these ventilation slots is enabled.

In one exemplary embodiment, one of the two plate-shaped light guides is embodied to be flat. A homogenous radiation of the light in one direction forwards can take place across the entire surface.

In one exemplary embodiment, a plate-shaped light guide of these at least two separate plate-shaped light guides is embodied to be uneven. It has a plate region facing the other light guide. This facing plate region is convex. One end of this plate region, which is facing the other plate-shaped light guide, forms the first edge of this plate-shaped light guide. This exemplary embodiment is advantageous so that a gradual edge region of this curved plate-shaped light guide is therefore formed, which is facing another further plate-shaped light guide arranged directly in series therewith. On the other hand, unwanted edges are therefore avoided, so that a radiation of the light from the curved plate-shaped light guide is carried out in a homogenous and uniform manner. Undesirably strong reflections of possible bends or angles of a light guide of this type are therefore avoided. On the other hand, on account of this convex plate region, the air flow, which flows through the holes, in particular the ventilation slots, into the region upstream of the lighting module, can be distributed in an improved manner. This air therefore then initially flows to this convex plate region and is routed forward as uniformly as possible. As a result, undesirably strong turbulences of the air can also be avoided. As a result, this shape of the plate-shaped air guide with the convex plate region is also advantageous with respect to the air guide in addition also to the optical advantage in respect of the air radiation. In particular, this convex plate region is also facing the holes in the offset, in particular the spacer wall.

In one exemplary embodiment, the convex plate region extends across the entire height of the plate-shaped light guide. The height is oriented here at right angles to that direction in which the plate-shaped light guides are arranged in series with one another. The afore-cited advantages can therefore be reached across the entire height of this light guide arrangement.

In one exemplary embodiment, at least one plate-shaped light guide has a light-reflecting structure at least in regions on a rear. With this light-reflecting structure, the light in the light guide can be reflected in a defined manner to a front side of the light guide. A very high portion of the light coupled into the light guide can therefore be emitted in a defined manner across this front side. This can also take place in a very uniform and thus also homogenous manner.

In one exemplary embodiment, this light-reflecting structure is a laser structure. It can therefore be produced very exactly and precisely. In this regard a laser can also generate very small and filigree structures in a very precise manner. In particular, the light-reflecting structure is integrated into the light guide and can thus be removed without damage.

In one exemplary embodiment, the plate-shaped light guides are arranged in a direction in which they are arranged adjacent to one another in series, without a gap or with an overlap of between greater than 0 cm and less than 3 cm. This means that with a projected view, in which the two plate-shaped light guides are projected forwards in a shared projection plane when viewed, no gap is embodied at the interface between these two plate-shaped light guides. It is possible, however, for an overlap in this regard to be formed with a projected view of this type. In the three-dimensional view this means that one of the two plate-shaped light guides also extends in an overlapping manner behind the other plate-shaped light guide. In particular, this may be the case in that for instance the convex plate region of the one light guide extends in an overlapping manner behind the other light guide.

An exemplary embodiment is preferably provided, in which an overlap of this type is not provided and the arrangement is such that with a projected view, a gap-free or distance-free arrangement of the two first edges to one another is achieved.

In particular, in an advantageous exemplary embodiment, the offset, which is formed in particular by the spacer wall, is therefore also embodied in a two-dimensional manner in a plane which is oriented at right angles to that plane in which the basic lighting module is embodied to be two-dimensional.

In an exemplary embodiment, the support apparatus is embodied so that it has both separate plate-shaped light guides. A support apparatus is therefore provided for both plate-shaped light guides. In this respect the support apparatus can be embodied in one piece. It can be embodied from plastic, for instance. For instance, this support apparatus can be embodied as an injection molded part.

By means of an embodiment of this type, this can save on manufacturing outlay on the one hand and assembly effort on the other. Position tolerances which may occur with two separate support apparatuses can be avoided as a result. One exemplary embodiment is possible, however, in which each lighting sub-module has a separate support apparatus, and these two support apparatuses are coupled to one another. In this respect, a non-destructive detachable mechanical coupling apparatus can then also be provided between these two support apparatuses. For instance, a plug-in connection or a snap-fit connection or also however a screw connection can be provided here.

In one exemplary embodiment, the support apparatus has at least one frame, on which a plate-shaped light guide is arranged. In particular, the plate-shaped light guide is surrounded at least peripherally in regions by this frame. In one exemplary embodiment, the support apparatus has a support tub or a support trough, in which the plate-shaped light guide is arranged. As a result, a particularly safe and positionally accurate arrangement is enabled. A stable mechanical support of this light guide on the support apparatus is enabled as a result.

One embodiment of this type with a support trough is also particularly advantageous for that plate-shaped light guide which, in one advantageous exemplary embodiment, has the afore-cited convex plate region. In particular, it is then not only possible for this plate-shaped light guide to rest with its rear on the whole surface of the base of the support trough. A particularly stable fastening and arrangement of this light guide is enabled as a result. The same can also be provided for the other light guide, which is embodied in particular to be completely flat. Moreover, on account of such an embodiment of the support apparatus with at least one support trough, an arrangement of the respective light guide which is protected to the side and to the rear is also enabled.

In one exemplary embodiment, the lighting module has a diffuser plate which is separate to the light guide. In one exemplary embodiment, this diffuser plate is arranged on a front side of the plate-shaped light guide. It can be arranged directly adjoining thereto. With the diffuser plate, the light coupled out of the light guide via the front side is scattered as intended and in a functional manner. The diffuser plate is embodied to diffusely scatter the light. As a result, an even more uniform and homogenous light image can be produced, in particular almost a homogenously radiated light plate.

In one exemplary embodiment, the diffuser plate can be embodied as a plate connected in a non-destructive, detachable manner to the light guide. It is also possible, however, for this diffuser plate to be fixedly connected to the light guide. Detachment is therefore only possible by means of destruction. It is also possible, however, for the diffuser plate and the light guide to be embodied in one piece.

In one exemplary embodiment, at least one light guide has a second edge which faces the first edge. The at least one light source module of the lighting module is arranged so that light from this light source module can be or is coupled through the second edge into the plate-shaped light guide. In one exemplary embodiment, light is therefore not targetedly coupled into the light guide via this first edge. An improved concept with respect to light coupling into the light guide and a then improved radiation of the light is as a result also only achieved by way of the front side of the light guide. Moreover, on account of this embodiment, the installation space at the first edge is also enabled, so that the afore-claimed additional functionality, which the light module provides as a result of this offset, can be targetedly improved. Undesirable space restrictions or negative effects from this possible further functionality at this specific local point of the offset are avoided as a result.

In addition or instead, at least one of the two light guides has a third edge which ends at the first edge. In this exemplary embodiment, the light source module is arranged so that light from this light source module can be coupled through the third edge into the plate-shaped light guide. Also in this regard, the advantages apply in terms of how they were already mentioned in the exemplary embodiment for arranging the light source module in the region of the second edge. This makes it possible for a light coupling also to be able to take place in respect of this third edge on a lower, in particular horizontal, edge and/or on an upper, in particular horizontal edge of a light guide. In one exemplary embodiment, in which the light guide is square in terms of its plate shape, light can therefore be radiated into the light guide by way of one or two or then preferably at most three different edges, which are different from the first edge. A coupling of light onto all four edges is also possible. In particular, provision is made for these exemplary embodiments also additionally to be embodied with at least the second light guide of the lighting module.

In one exemplary embodiment, the lighting module has three separate lighting sub-modules, which each have a separate plate-shaped light guide. In one exemplary embodiment, viewed in the width direction of the household refrigeration appliance, the lighting sub-modules are arranged in series with one another and directly adjoining one another. The first light guide of the first lighting sub-module has a first edge and the second light guide of the second lighting sub-module has a first edge. These two light guides are arranged so as to face one another with their first edges. In one direction an offset between the first edges is embodied at right angles to the plane of the lighting module, so that in this direction these two first edges are arranged at a distance from one another at a right angle to this plane. Furthermore, the second light guide is embodied with a further first edge which faces the first edge. In one exemplary embodiment the third light guide is moreover embodied with a first edge, which is arranged facing this further first edge of the second light guide. In one direction at right angles to the plane of the lighting module, an offset is also embodied here between this further first edge of the second light guide and the first edge of the third light guide. Also in this regard this further first edge of the second light guide and this first edge of the third light guide are arranged in this direction at a distance from one another at right angles to this plane of the lighting module. Lighting sub-module thirds are therefore produced, in which in each case starting from the middle to the then further lighting sub-modules arranged to the left and right, a rearwardly formed offset is formed between these cited first edges. A symmetrical embodiment of the lighting module can therefore also be achieved in this respect. In particular, these two offsets, which are embodied parallel to one another and are formed in each case in particular by a spacer wall, are configured in each case with individual ventilation slots. Therefore air can be distributed forwards from behind the lighting module in a symmetrical manner. In particular, the lighting module is embodied in symmetry with the center axis. The center axis is oriented in the height direction.

In one exemplary embodiment, it is possible for this lighting module to be arranged in a rear region in the receiving compartment. In particular, this lighting module can be arranged immediately in front of a rear wall of an inner container, which bounds the receiving compartment with its walls. It is also possible for a lighting module of this type to be arranged on a vertical side wall of an inner container, however. It is also possible for a lighting module of this type to be arranged on a ceiling wall or a base wall of the inner container and in this regard likewise to be positioned in the receiving compartment.

In one exemplary embodiment, the ventilation slots are embodied as vertical elongated holes which are therefore oriented in the height direction of the lighting module. It is therefore advantageously possible for as much air as possible to flow through the holes, but the offset in one direction at right angles to the two-dimensional plane of the lighting module need not be designed to be too large.

In one exemplary embodiment, a number of light source modules are provided. These can be arranged on the already afore-cited different edges. Therefore, light sources, such as light-emitting diodes, can be arranged directly adjacent to these coupling edges. As comprehensive and loss-free a coupling of the emitter light into the light guide as possible is enabled as a result. A large-area light module can be provided by means of the proposed lighting module. In this regard simple assembly is possible. In particular, complicated adhesion processes, such as required with conventional lighting modules, can be dispensed with. With this exemplary embodiment of a lighting module, adhesive residues cannot reach between a diffuser plate and the light guide. A very process-stable manufacture of a lighting module of this type is enabled.

The specifications "above," "below," "in front," "behind," "horizontal," "vertical," "depth direction," "width direction," "height direction," etc., indicate positions and orientations during proper use and arrangement of the appliance.

Further features of the invention are disclosed in the claims, the figures and the description of the figures. The features and combinations of features cited above in the description as well as the features and combinations of features cited below in the description of the figures and/or shown alone in the figures cannot only be used in the respectively specified combination, but also in other combinations without departing from the scope of the invention. Embodiments of the invention are therefore also considered to be included and disclosed, which are not explicitly shown and explained in the figures, but emerge and can be produced from the cited embodiments as a result of separated combinations of features. Embodiments and combinations of features are also considered to be disclosed, which therefore do not have all the features of an originally worded independent claim. Moreover, embodiments and combinations of features, in particular as a result of the afore-cited embodiments, are considered to be disclosed, which extend beyond or deviate from the combinations of features presented in the references of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Identical or functionally identical and equivalent elements are provided with the same reference characters throughout the figures.

DETAILED DESCRIPTION OF THE INVENTION

Figure 1:
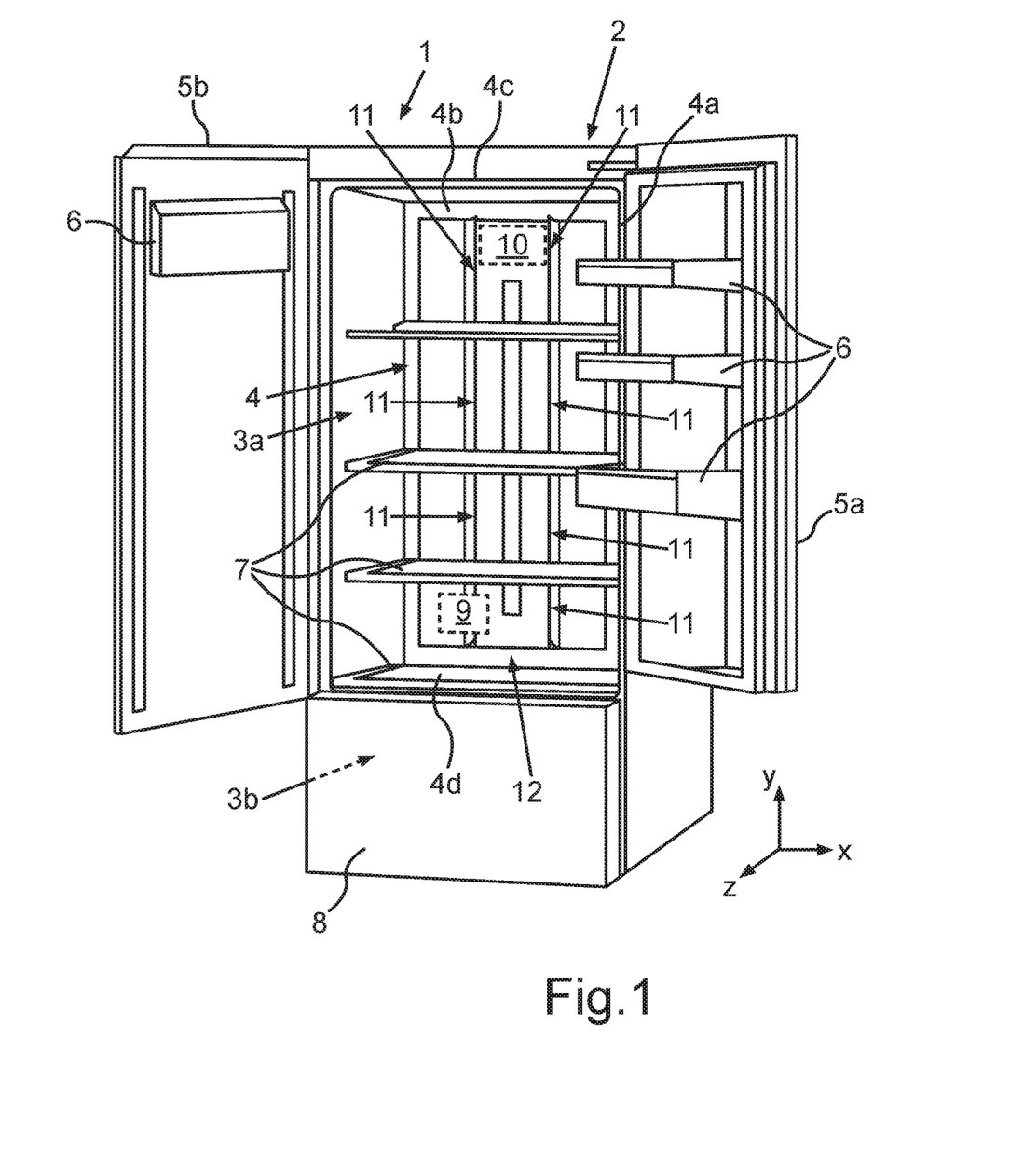
FIG. 1 shows a perspective view of an exemplary embodiment of an inventive household refrigeration appliance with an exemplary embodiment of an inventive lighting module.

Referring now to the figures of the drawing in detail and first, in particular, to FIG. 1 thereof, there is shown a perspective view of a household refrigeration appliance 1. The household refrigeration appliance 1 is embodied to store and conserve food. It may be a refrigerator or a freezer or a fridge-freezer.

The household refrigeration appliance 1 has a housing 2. A first receiving compartment 3a is embodied in the housing 2. In the exemplary embodiment, the first receiving compartment 3a is a refrigeration compartment. In an advantageous exemplary embodiment, the household refrigeration appliance 1 has a second receiving compartment 3b which is separated therefrom. In one exemplary embodiment, the second receiving compartment 3b is a freezer compartment.

As is apparent, the first receiving compartment 3a is bound by an inner container 4. This inner container 4 has vertical side walls 4a, a rear wall 4b, a ceiling wall 4c and a base wall 4d.

In the exemplary embodiment shown, this first receiving compartment 3a can be closed in the depth direction (z-direction), viewed forward, by at least one door. In the exemplary embodiment, the compartment 3a is closed by French doors, namely, two separate doors 5a and 5b. These are swing doors which can be pivoted about a vertical axis, in each case. They are shown in the opened state in FIG. 1. In one exemplary embodiment, the doors 5a and 5b can have door racks 6.

Lower shelves 7 can be arranged as shown by way of example in the receiving compartment 3a.

The further receiving compartment 3b can be closed at the front by a further door 8. The further door 8 can be a front wall of a drawer. The door 8 is separate from the two doors 5a and 5b.

Figure 3:
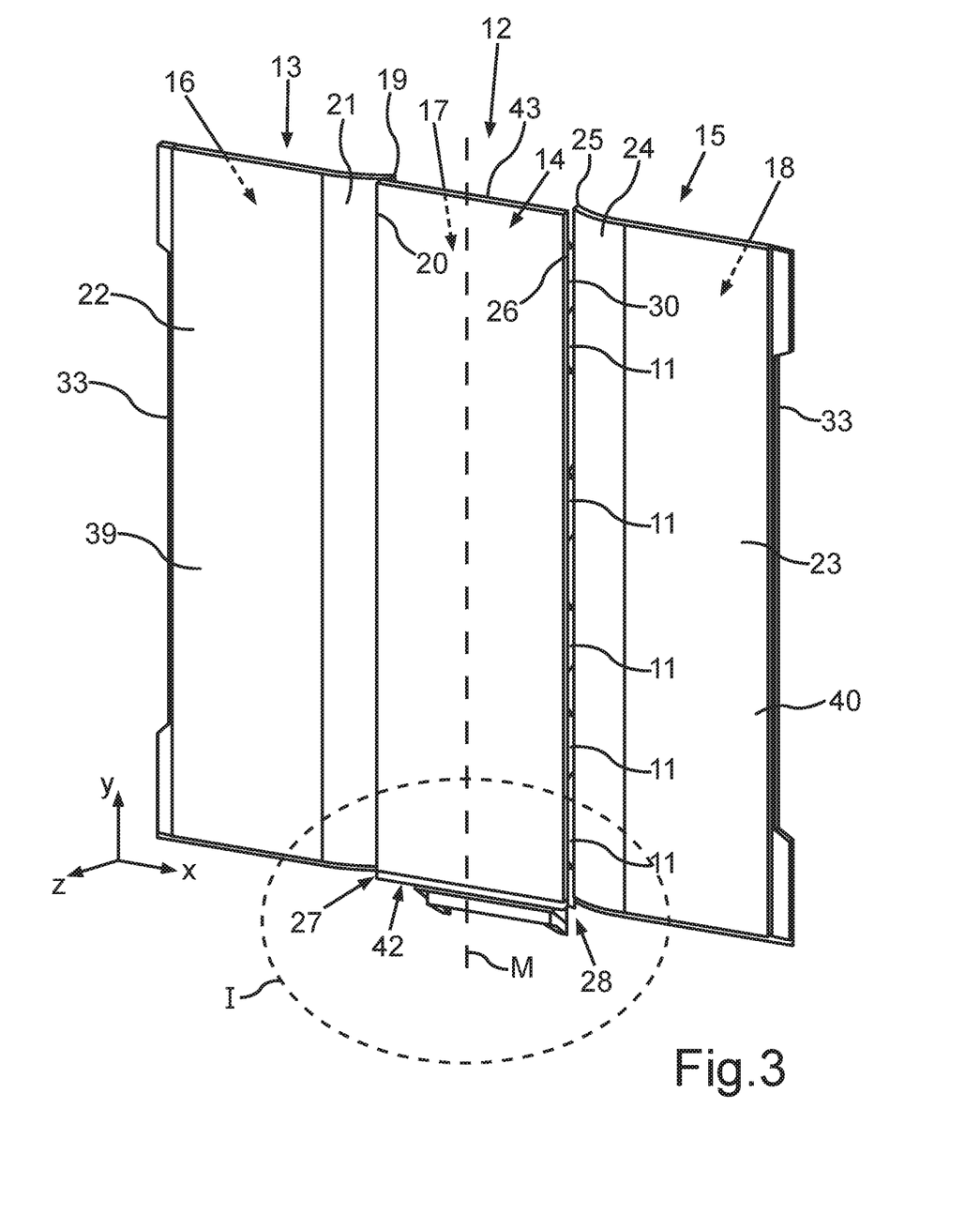
FIG. 3 shows a perspective view of an exemplary embodiment of a lighting module in the front view.

In the exemplary embodiment, the household refrigeration appliance 1 moreover has a control apparatus 10. The control apparatus 10 is configured at least to control a refrigeration or cooling appliance 9 of the household refrigeration appliance 1 so that the receiving compartment 3a and the receiving compartment 3b have a predetermined or predeterminable target temperature. In particular, a controller can also be provided here. The refrigeration appliance 1 has an air duct or flow duct which runs at least partially on the rear wall 4b and is coupled to the cooling appliance 9. This has at least one duct opening, in particular a number of duct openings, which, in the exemplary embodiment shown here, end in the receiving compartment 3a. Here these duct openings are holes, in particular ventilation slots 11 (FIG. 3, 4). This makes it possible for air cooled by the cooling appliance 9 to reach into the receiving compartment 3a by way of the air duct of an air duct system 31 (FIG. 4) and the ventilation slots 11. The same can also be provided with respect to the receiving compartment 3b. The air duct system 31 is in particular a multi air duct system with a number of air ducts. The cooling appliance 9 can comprise a compactor, an evaporator and a compressor.

The household refrigeration appliance 1 has at least one plate-shaped, or planar, lighting module 12. This lighting module 12 is provided and arranged intentionally to light the receiving compartment 3a. In the exemplary embodiment, this plate-shaped lighting module 12 is formed by a surface, which takes up at least 50 percent, in particular at least 60 percent, in particular at least 70 percent, in particular at least 80 percent or the surface of the rear wall 4b. In particular, in the exemplary embodiment shown, this lighting module 12 can also be arranged on this rear wall 4b. In another exemplary embodiment, a lighting module 12 can however also be arranged on a side wall 4a and/or on a ceiling wall 4c and/or on a base wall 4d and/or on an inner cladding of a door 5a, 5b of this type which faces the receiving compartment 3a when the door 5a, 5b is in the closed state.

Figure 2:
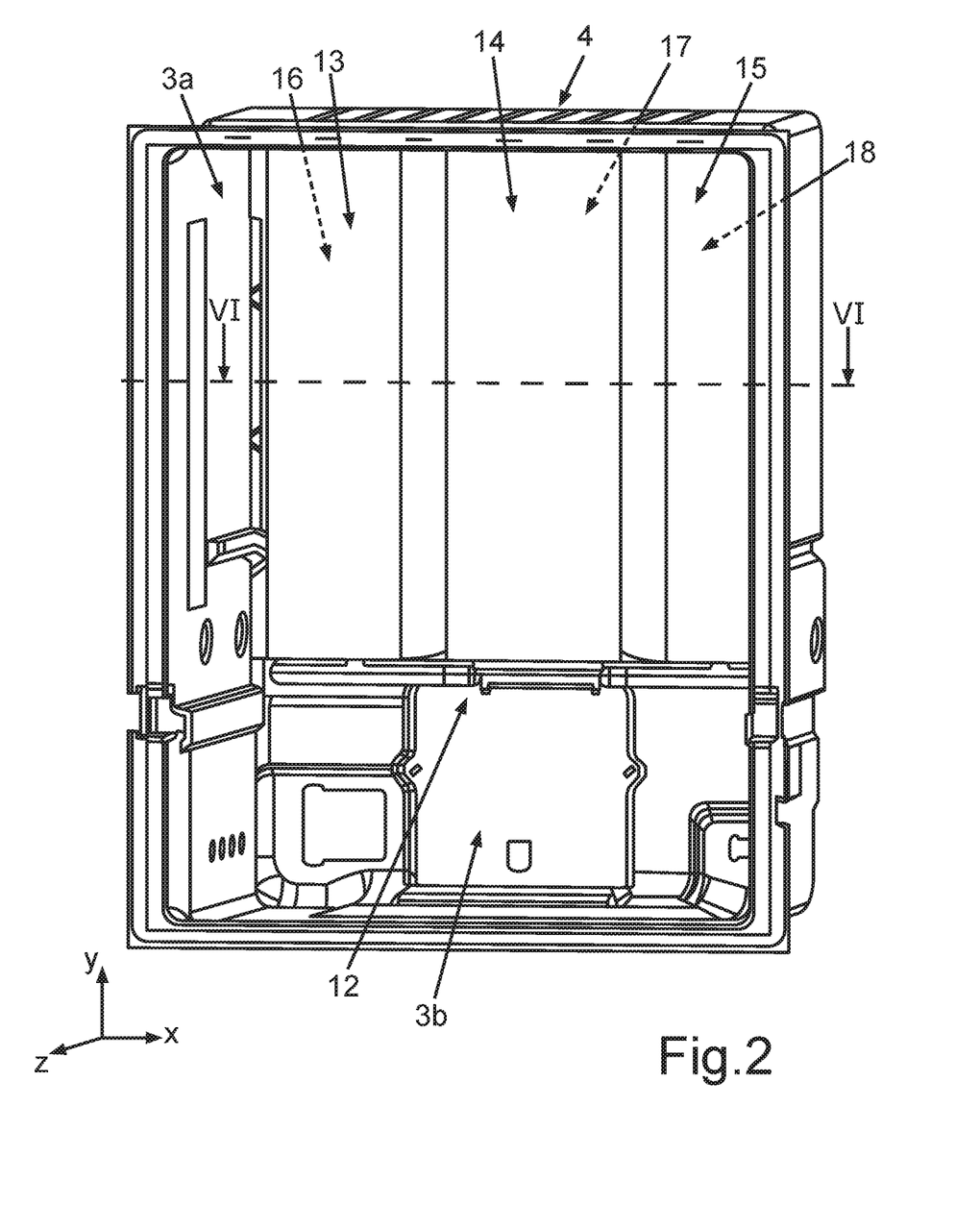
FIG. 2 shows a perspective view of an inner container of the household refrigeration appliance according to FIG. 1, with an exemplary embodiment of a lighting module arranged in the receiving compartment.

FIG. 2 shows a perspective view of the inner container 4 with a view forward into the first receiving compartment 3a. Moreover, an inner container 4 is provided here, which is also embodied for the second receiving compartment 3b. The separating wall provided here and embodied in the assembled end state, in order to separate the first receiving compartment 3a from the second receiving compartment 3b, is not shown here.

The lighting module 12 is shown in FIG. 2. In this regard it is arranged in the receiving compartment 3a and positioned immediately in front of the rear wall 4a. It therefore extends in a two-dimensional manner in a plane, which is covered by the height direction (y-direction) and the width direction (x-direction). A very uniform and comprehensive lighting of the receiving compartment 3a from the rear is enabled as a result.

The lighting module 12 extends substantially across the entire height of the first receiving compartment 3a. In the exemplary embodiment shown, this lighting module 12 has a first lighting sub-module 13. Furthermore, it has a second lighting sub-module 14. In one exemplary embodiment, which is shown here, the lighting module 12 furthermore has a third lighting sub-module 15. These three lighting sub-modules 13, 14, 15 here are separate modules. This relates in particular to the associated light conductor. To this end, the first lighting sub-module 13 has a first plate-shaped light guide 16. The second lighting sub-module 14 has a separate second plate-shaped light guide 17. Furthermore, the third lighting sub-module 15 has an in turn separate plate-shaped light guide 18. In the width direction (x-direction), these lighting sub-modules 13, 14, 15 are arranged adjacent to one another and in direct series with one another. This therefore applies in particular to the respective separate plate-shaped light guides 16, 17 and 18.

FIG. 3 shows an exemplary embodiment of the plate-shaped lighting module 12, namely, the one that is installed in FIG. 1 and FIG. 2 in the household refrigeration appliance 1. FIG. 3 shows a view from the front onto the lighting module 12. In the installed state, the front side in this respect is facing the receiving compartment 3a. As can be seen, the first light guide 16 is embodied with a first edge 19. This first edge 19 is facing a first edge 20 of the second plate-shaped light guide 17. These two first edges 19, 20 extend in the height direction in FIG. 3. They each extend across the entire height of this rectangular or essentially rectangular, plate-shaped light guide 16. As moreover can be seen in FIG. 3, the first light guide 16 has a curved plate region 21. This plate region 21 is convex. One end of this convex plate region 21 which faces the second light guide 17 is formed by the first edge 19 of the first light guide 16. The curved plate region 21 in this respect ends at a flat further plate region 22 of this first plate-shaped light guide 16. As can be seen, this curved plate region 21 is curved rearward. As a result, an offset between the first edge 19 of the first light guide 16 and the first edge 20 of the second light guide 17 is formed in the depth direction (z-direction). These two first edges 19 and 20, which extend in a straight line in the height direction, therefore do not run in a shared plane. The curved light guide 16 is embodied in one piece.

As can be seen in FIG. 3, in this exemplary embodiment the second plate-shaped light guide 17 is embodied to be flat. Furthermore, it is clear that the third plate-shaped light guide 18 here is likewise embodied to be uneven. It is embodied in one piece. It is embodied in a flat plate region 23 facing away from the second light guide 17. A curved plate region 24 in turn adjoins this flat sub region 22. This curved plate region 24 here of the third plate-like light guide 18 is convex. This curved plate region 24 extends across the entire height of the third plate-shaped light guide 18, as also applies to the curved plate region 21 of the first plate-shaped light guide 16. This third light guide 18 also has a first edge 25. This first edge 25 is facing a further first edge 26 of the second plate-shaped light guide 17. The two first edges 20 and 26 of the second plate-shaped light guide 17 are oriented parallel to one another. Provision is also made here for the free end of the curved plate region 24, which is facing the second light guide 17, to be formed by the first edge 25 of the third plate-shaped light guide 18. An offset between this first edge 25 and the further first edge 26 is also embodied here in the depth direction, as can be seen in FIG. 3. The first edges 19 and 20 are therefore arranged in a direction at right angles to the plane, in which the lighting module 12 is arranged offset with one another in a two-dimensional extension (corresponding to x-y plane). In particular, an offset of this type in this direction at right angles to the plane of the lighting module 12 is greater than or equal to 2 cm and smaller than or equal to 5 cm, in particular between 2 cm and 3 cm.

Figure 4:
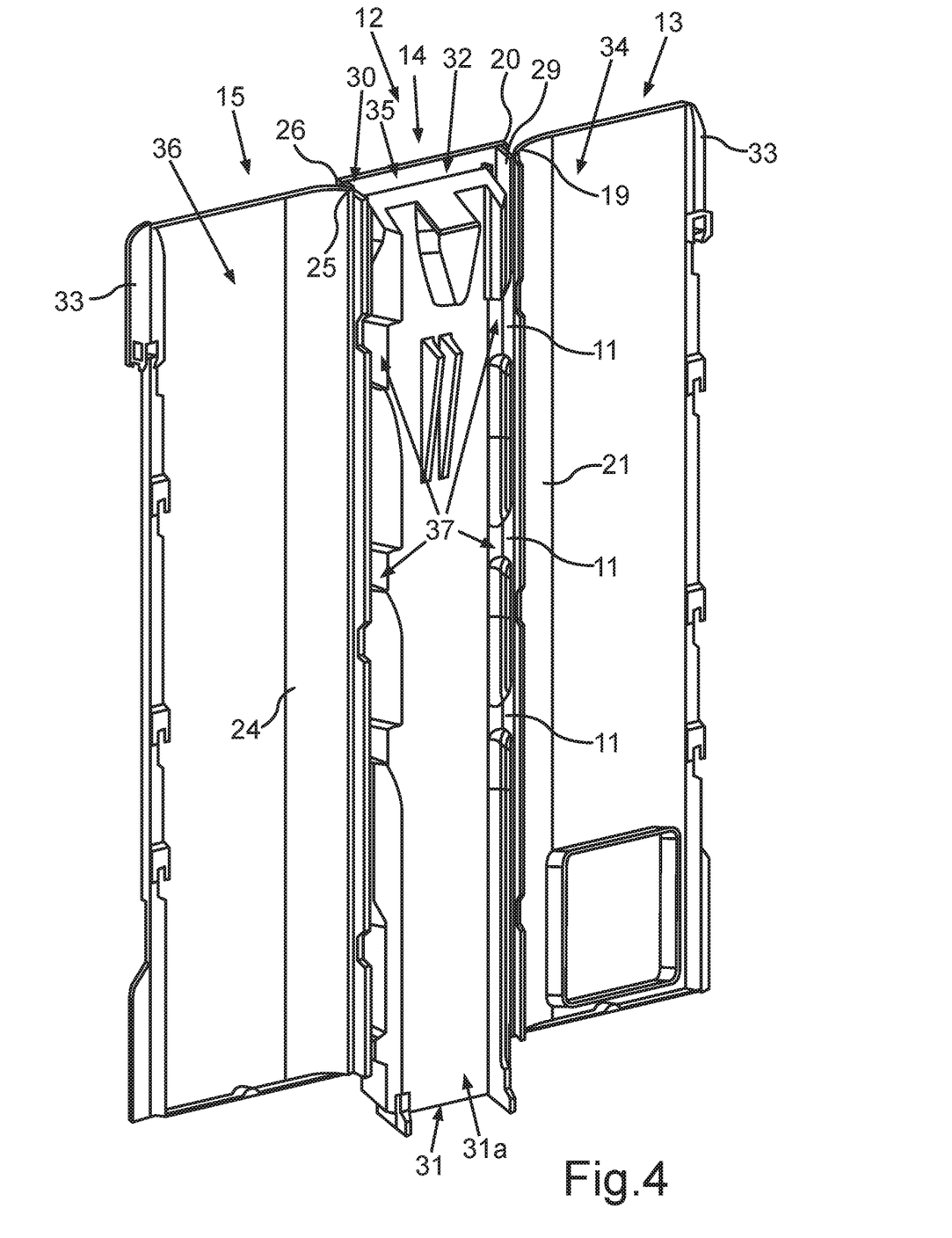
FIG. 4 shows the lighting module according to FIG. 3 in a perspective rear view.

As already also apparent from FIG. 3, a respective spacer wall 29—see, FIG. 4—and 30 is formed in the region of a respective offset 27 or 28 of this type. This means that the respective gap in this depth direction is not completely empty between the first edges 19 and 20 and 25 and 26, but a connecting wall of this type is embodied as a spacer wall 29 or 30. The relative positioning of the cited components with respect to one another is therefore also stabilized.

In one exemplary embodiment, these spacer walls 29 and 30 extend in a two-dimensional manner in planes which are covered by the height direction (y-direction) and the depth direction (z-direction). These planes are therefore at right angles to the plane in which the lighting module 12 extends in a two-dimensional manner.

As already clear in FIG. 3 and in particular then also in FIG. 4, the above-mentioned ventilation slots 11 are embodied in these spacer walls 29 and 30. In the exemplary embodiment these holes or ventilation slots 11 are embodied as vertical slots. They are in particular elongated holes.

FIG. 4 shows that the lighting module 12 according to FIG. 3, shown in a perspective view from the rear, is provided with a component 31a. The component 31a is an integral part of the air duct and the air duct system 31. In the exemplary embodiment shown, this component 31a is arranged on the rear of the second lighting sub-module 14. In particular, in this regard it is arranged on a support apparatus 32 of the lighting module 12. This support apparatus 32 is therefore to receive and support the light guides 16, 17, 18 of the lighting sub-modules 13, 14, 15. Provision can be made for this support apparatus 32 to be formed for all three lighting sub-modules 13, 14, 15. In the context, the support apparatus 32 can also be embodied in one piece. It is also possible, however, for each lighting sub-module 13, 14, 15 to have its own separate support apparatus 32.

As can be seen, the support apparatus 32 is embodied with a support frame 33. This respective support frame 33 surrounds the separate light guides 16, 17 and 18 in each case peripherally, at least in regions. In one exemplary embodiment, the support apparatus 32 is embodied with support tubs or support troughs 34, 35 and 36. In the exemplary embodiment shown, each of these support troughs 34, 35, 36 is closed, in particular completely closed, to the rear. As a result, a bottom of the tub is formed in each case. The respective individual separate plate-shaped light guides 16, 17 and 18 are received in these support troughs 34, 35, 36. They can be arranged partially countersunk therein. In particular, a respective tub edge, in particular the two outer support troughs 34 and 36, is formed by the support frame 33.

The component 31a can be coupled to a further component 31a, not shown here, so that in this regard the air duct thus formed is closed to the rear. As can be seen, this component 31a has lateral openings 37, of which only a few are shown with the corresponding reference characters, for the sake of clarity. These end in the ventilation slots 11.

As can be seen, the ventilation slots 11, viewed in the depth direction, are arranged completely behind the second plate-shaped light guide 17. In this regard, they are arranged in the width direction also not laterally with respect to this second plate-shaped light guide 17. With a front view, in one exemplary embodiment these ventilation slots 11 are therefore concealed at the front by the second plate-shaped light guide 17.

Figure 5:
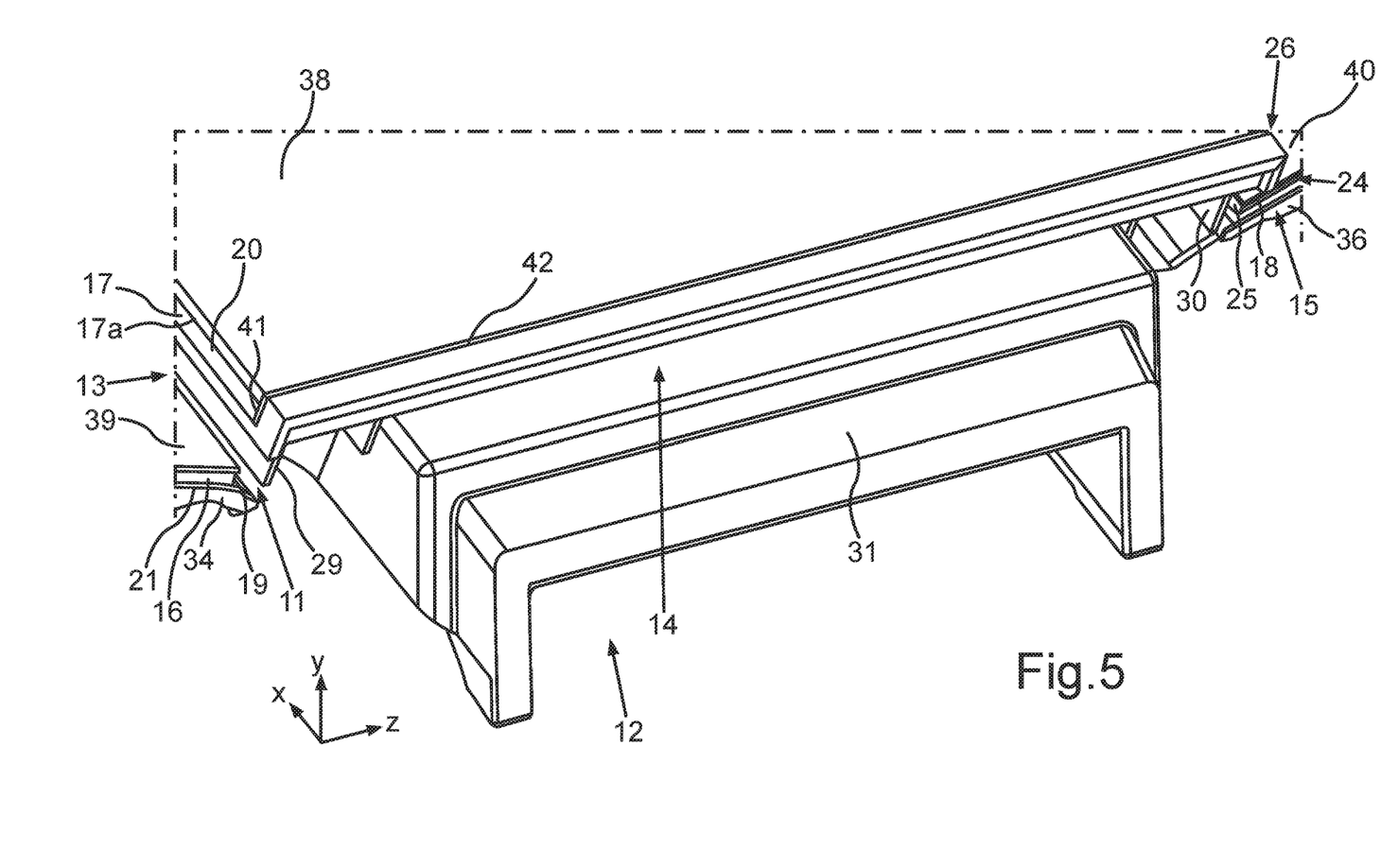
FIG. 5 shows a perspective partial view of the lighting module according to FIG. 3 and FIG. 4.

FIG. 5 shows a perspective representation of the partial cutout I in FIG. 3. It can be seen here that a diffuser plate 38 is arranged on a front side 17a of the second plate-shaped light guide 17. The diffuser plate 38 conceals the front side 17a completely or covers this completely. Accordingly, a diffuser plate 39, 40 (FIG. 3) is also arranged so as to cover the respective front sides of the further plate-shaped light guides 16 and 18 in each case.

The offset formed in the depth direction between the edges 19 and 20 is not shown explicitly here.

Furthermore, it is also clear that the second plate-shaped light guide 17 shown here has a further edge 41. This further edge 41 ends at the first edge 20. Here the further edge 41 can be a second edge. In this second edge 41, a light source module 42 of the lighting module 12 is arranged adjacent, in particular resting directly thereon. The light source module 42 has in particular a number of light sources, preferably light-emitting diodes. Light which is emitted from these light sources is then injected directly via this further, here second edge 41 of the plate-shaped light guide 17, into this light guide 17. Accordingly, this second plate-shaped light guide can also have yet another further edge 43 (FIG. 3). In this exemplary embodiment, this is likewise a further edge which ends at the first edge 20. The further edge 41 is here a lower boundary edge of the light guide 17, viewed in the height direction. In the exemplary embodiment the possible further edge 43 here is an upper edge of the light guide 17, viewed in the height direction. A further light source module can also be arranged there in addition to or instead of the light source module 42. Light from the light sources of this further light source module can then also be coupled into the light guide 17 by way of this further edge 43.

In the exemplary embodiment shown, it is also possible for a further light source module to be arranged on the first edge 20 and/or on the further first edge 26. Therefore in addition or instead of the previously explained exemplary embodiments, the light can also be coupled directly into the plate-shaped second light guide 17 by way of these first edges 20 and/or 26.

This coupled-in light is then radiated again by way of the front side 17a.

Figure 6:
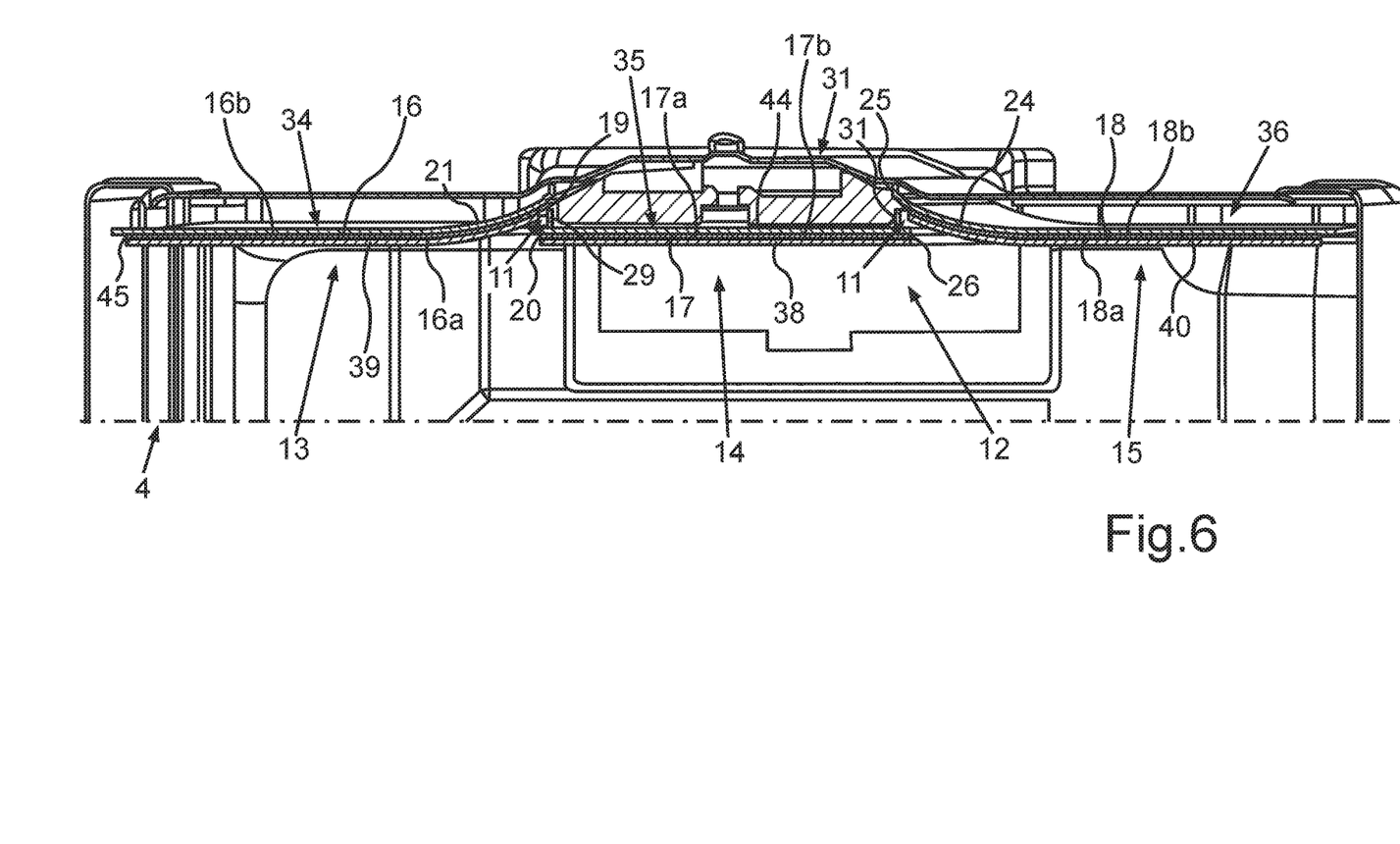
FIG. 6 shows a perspective sectional view through the arrangement according to FIG. 2.

FIG. 6 shows a perspective sectional representation of the arrangement according to FIG. 2 along the line of intersection VI-VI. As also already clear in FIG. 3, the lighting module 12 is embodied in symmetry with an axis M. This axis M extends in the height direction of the lighting module 12. Accordingly the symmetry can also be seen in FIG. 6. The convex plate regions 21 and 24 can be seen. In the width direction (x-direction), it is clear from the example here that the first edges 19 and 20 in this width direction are arranged almost without a gap from one another. This means that with a projected view in a plane, which is covered by the height direction and the width direction, there is no gap formed between these first edges 19 and 20. The same applies to the first edge 25 and the further first edge 26.

In one exemplary embodiment, a light-reflecting structure is embodied on a rear side 17b of the second plate-shaped light guide 17. In particular, this light-reflecting structure 44 is a laser structure. Accordingly, a light-reflecting structure of this type can also likewise be embodied on rear sides 16b and/or 18b of the light guides 18 and 16.

It is also clear in FIG. 6 that a light source module can be arranged on an outer edge 45 of the plate-shaped light guide 16 which faces a first edge 19. Therefore light with this light source module can also be injected into the plate-shaped light guide 16 by way of this opposite second edge 45, which faces the first edge 19. In a further exemplary embodiment, provision can also be made here for a light source module of this type likewise to be arranged on an upper and/or lower further edge, viewed in the height direction, which ends both at the first edge 19 and also at the second edge 45. Therefore in addition to, or instead of, light can also be coupled into this plate-shaped light guide 16 by way of these further upper and lower edges of the light guide 16. The same can also be embodied in the case of the light guide 18. The diffuser plate 39 is also shown here. In particular, it rests on a front side 16a of the light guide 16. Furthermore, the diffuser plate 40 is also shown, which is arranged in particular on a front side 18a of the plate-shaped light guide 18 or in particular rests directly thereupon. Similarly, the diffuser plate 38 rests in particular directly on the front side 17a of the light guide 17. It can also furthermore be seen in the figures shown that the diffuser plates 39 and 40 are likewise convex at their ends which face the middle lighting sub-module 14.

As already mentioned, with a projected view of this type the first edges 19 and 20 are gapless and therewith in this respect without a gap in the width direction, but also without an overlap here. The same applies accordingly to the further first edge 26 and the first edge 25. It is also possible that in this respect in the width direction an overlap is formed between the first edges 19 and 20 and/or between the further first edge 26 and the first edge 25.

The following is a summary list of reference numerals and the corresponding structure used in the above description of the invention:

1 household appliance
2 housing
3a first receiving compartment
3b second receiving compartment
4 inner container
4a side wall
4b rear wall
4c ceiling wall
4d base wall
5a door
5b door
6 door rack
7 shelf
8 door
9 refrigeration appliance
10 control apparatus
11 ventilation slots
12 lighting module
13 first lighting sub-module 14 second lighting sub-module
15 third lighting sub-module
16 first light guide
16a front side
16b rear side
17 second light guide
17a front side
17b rear side
18 third light guide
18a front side
18b rear side
19 edge
20 edge
21 plate region
22 plate region
23 plate region
24 plate region
25 edge
26 edge
27 offset
28 offset
29 distance wall
30 distance wall
31 air duct system
31a component
32 support apparatus
33 support frame
34 support trough, or tub
35 support trough, or tub
36 support trough, or tub
37 opening
38 diffuser plate
39 diffuser plate
40 diffuser plate
41 edge
42 light source module
43 edge
44 light-reflecting structure
45 edge
x width direction
y height direction
z depth direction

The invention claimed is:

1. A household refrigeration appliance, comprising:
an appliance body formed with a receiving compartment for food and a planar lighting module for lighting said receiving compartment;
said planar lighting module having a support apparatus supporting a first lighting sub-module with a first plate-shaped light guide and a separate, second lighting sub-module with a second plate-shaped light guide;
said first and second lighting sub-modules being disposed directly adjacent one another;
each of said first and second light guides having a first edge, with said first edge of said first light guide facing said first edge of said second light guide; and
in a direction perpendicular to a plane defined by said lighting module, said first edges of said first and second light guides being disposed with an offset between said first edges and at a spacing distance from one another in the direction perpendicular to the plane of said lighting module.

2. The household refrigeration appliance according to claim 1, further comprising a spacer wall formed with holes disposed in a region of said offset.

3. The household refrigeration appliance according to claim 2, wherein said holes are ventilation slots of an air duct system of the household refrigeration appliance, through which air flows during an operation of the air duct system.

4. The household refrigeration appliance according to claim 3, further comprising an air duct of the air duct system arranged on a rear side of a respective said lighting sub-module configured to guide air in the air duct through the ventilation slots upstream of said lighting module.

5. The household refrigeration appliance according to claim 4, wherein said air duct is disposed on a rear side of said support apparatus of said lighting sub-module.

6. The household refrigeration appliance according to claim 1, wherein one of said plate-shaped light guides is a flat light guide.

7. The household refrigeration appliance according to claim 1, wherein one of said plate-shaped light guides is uneven and is formed with a convexly curved plate region facing the adjacent said light guide, wherein one end of said curved plate region that faces the adjacent said plate-shaped light guide, forms said first edge of said plate-shaped light guide.

8. The household refrigeration appliance according to claim 7, wherein said convexly curved plate region extends across an entire height of said plate-shaped light guide.

9. The household refrigeration appliance according to claim 1, wherein at least one of said plate-shaped light guides has a rear side with a light-reflecting structure, at least in regions thereof, configured to reflect light in said light guide to a front side of said light guide.

10. The household refrigeration appliance according to claim 9, wherein said light-reflecting structure is a laser structure.

11. The household refrigeration appliance according to claim 1, wherein said plate-shaped light guides, in a direction in which said light guides are arranged adjacent one another in series, are arranged without a gap or with an overlap of greater than 0 cm and less than 3 cm to one another.

12. The household refrigeration appliance according to claim 1, wherein both of said first and second plate-shaped light guides are arranged on said support apparatus.

13. The household refrigeration appliance according to claim 12, wherein said support apparatus has at least one support frame on which a respective said plate-shaped light guide is arranged.

14. The household refrigeration appliance according to claim 13, wherein said at least one support frame is a support trough in which said plate-shaped light guide is arranged.

15. The household refrigeration appliance according to claim 1, wherein said lighting module includes a diffuser plate that is separate from the respective said light guide and is arranged on a front side of said plate-shaped light guide.

16. The household refrigeration appliance according to claim 1, wherein:
at least one light guide has a second edge opposite said first edge, and said lighting module has a light source module, which is arranged to couple light from said light source module through said second edge into said plate-shaped light guide; and/or
at least one light guide has a third edge terminating at said first edge, and said lighting module has a light source module which is arranged to couple light from said light source module through the third edge into said plate-shaped light guide.

17. The household refrigeration appliance according to claim 1, wherein said lighting module:
has three separate lighting sub-modules, including said first lighting sub-module, said second lighting sub-module, and a third lighting sub-module, each with a separate plate-shaped light guide;

said lighting sub-modules are arranged in series with one another in a width direction of the household refrigeration appliance and adjacent one another;

said first light guide has a first edge and said second light guide has a first edge, and said first and second light guides are arranged with said first edges facing one another and forming an offset between said first edges in a direction perpendicular to a plane of said lighting module, the offset being formed between said first edges with a spacing distance between said first edges in the direction perpendicular to the plane of said lighting module;

said second light guide has a further first edge opposite said first edge and said third light guide has a first edge disposed to face said further first edge of said second light guide and to form an offset between said further first edge of said second light guide and said first edge of said third light guide in the direction perpendicular to the plane of said lighting module, the offset being formed between said further first edge of said second light guide and said first edge of said third light guide with a spacing distance between said edges in the direction perpendicular to the plane of said lighting module.

* * * * *